United States Patent
Cho et al.

(10) Patent No.: US 9,176,618 B2
(45) Date of Patent: Nov. 3, 2015

(54) DISPLAY SYSTEM FOR DISPLAYING AUGMENTED REALITY IMAGE AND CONTROL METHOD FOR THE SAME

(71) Applicant: LG ELECTRONICS INC., Seoul (KR)

(72) Inventors: Eunhyung Cho, Seoul (KR); Jongho Kim, Seoul (KR); Doyoung Lee, Seoul (KR); Jihwan Kim, Seoul (KR); Sinae Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 60 days.

(21) Appl. No.: 14/223,552

(22) Filed: Mar. 24, 2014

(65) Prior Publication Data

US 2015/0234508 A1    Aug. 20, 2015

(30) Foreign Application Priority Data

Feb. 17, 2014  (KR) ........................ 10-2014-0017876

(51) Int. Cl.
*G06F 3/041* (2006.01)
*G06T 19/00* (2011.01)
*G06F 3/01* (2006.01)

(52) U.S. Cl.
CPC .............. *G06F 3/0412* (2013.01); *G06F 3/013* (2013.01); *G06T 19/006* (2013.01); *G06F 2203/04102* (2013.01)

(58) Field of Classification Search
CPC  G06F 3/013; G06F 3/015; G06F 2203/04102
See application file for complete search history.

(56) References Cited

U.S. PATENT DOCUMENTS

| | | |
|---|---|---|
| 2003/0160892 A1 | 8/2003 | Tamura |
| 2005/0285963 A1 | 12/2005 | Misawa et al. |
| 2012/0235893 A1* | 9/2012 | Phillips et al. ................ 345/156 |
| 2012/0242865 A1 | 9/2012 | Vartanian et al. |
| 2013/0257775 A1 | 10/2013 | Lee |
| 2013/0278631 A1 | 10/2013 | Border et al. |
| 2013/0293577 A1 | 11/2013 | Perez et al. |
| 2014/0101560 A1* | 4/2014 | Kwak et al. .................. 715/738 |

FOREIGN PATENT DOCUMENTS

WO   WO 2011/005318 A2   1/2011

* cited by examiner

*Primary Examiner* — Kevin Nguyen
*Assistant Examiner* — Cory Almeida
(74) *Attorney, Agent, or Firm* — Birch, Stewart, Kolasch & Birch, LLP

(57) ABSTRACT

The display system displays, at a first position on the transparent flexible display unit, a first augmented reality object corresponding to a first real object forming a first angle relative to the camera unit, and displays, at a second position on the transparent flexible display unit, a second augmented reality object corresponding to a second real object forming a second angle relative to the camera unit, wherein, upon detecting bending of the transparent flexible display unit, the processor displays the first augmented reality object at a third position spaced a first distance apart from the first position, and displays the second augmented reality object at a fourth position spaced a second distance apart from the second position, wherein, when the first angle is greater than the second angle, the first distance is set to be greater than the second distance.

20 Claims, 14 Drawing Sheets

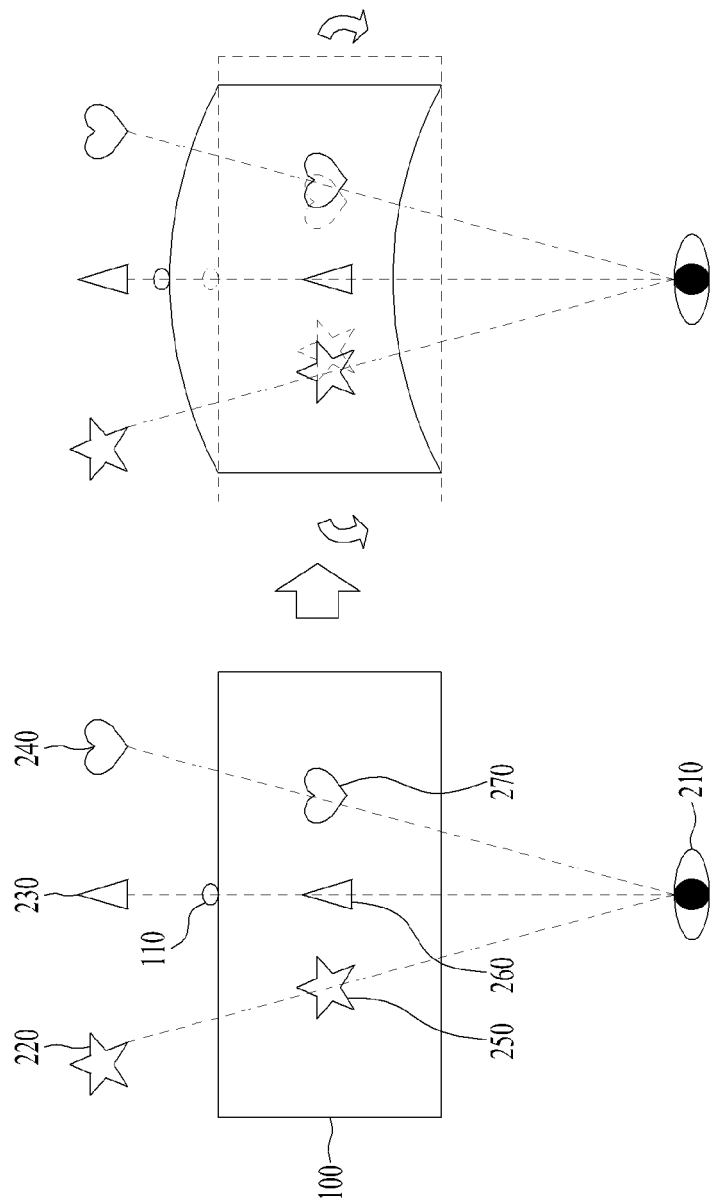

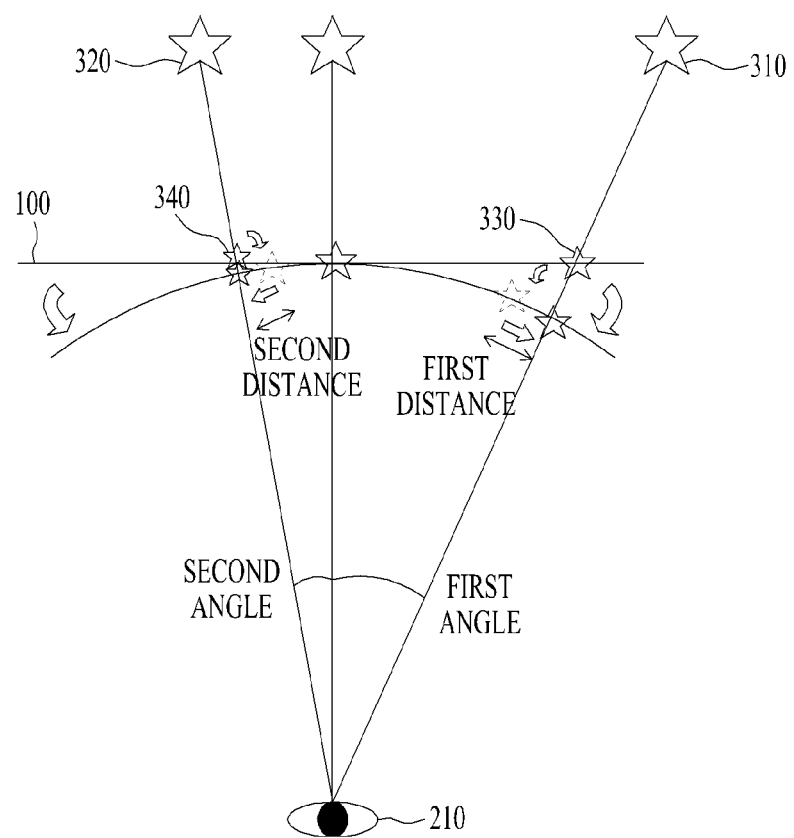

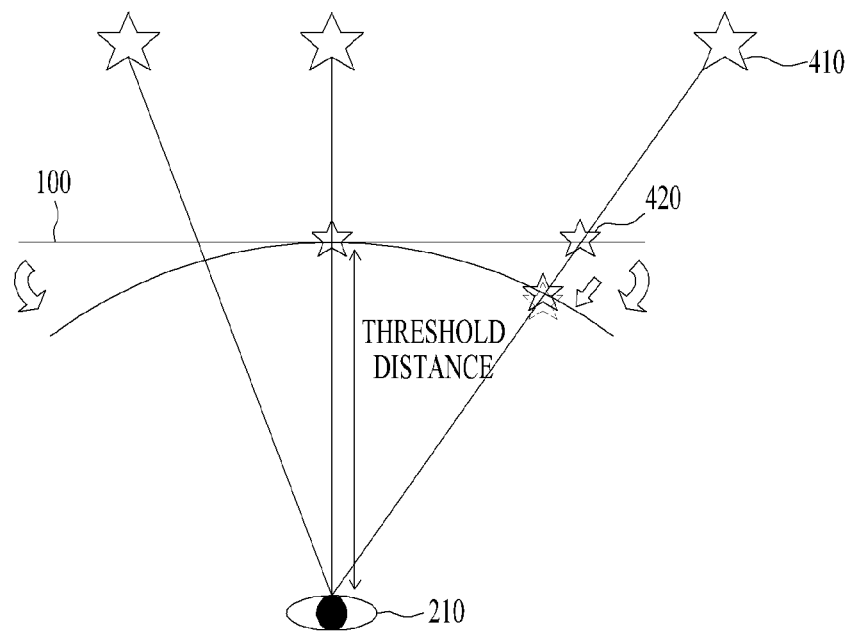

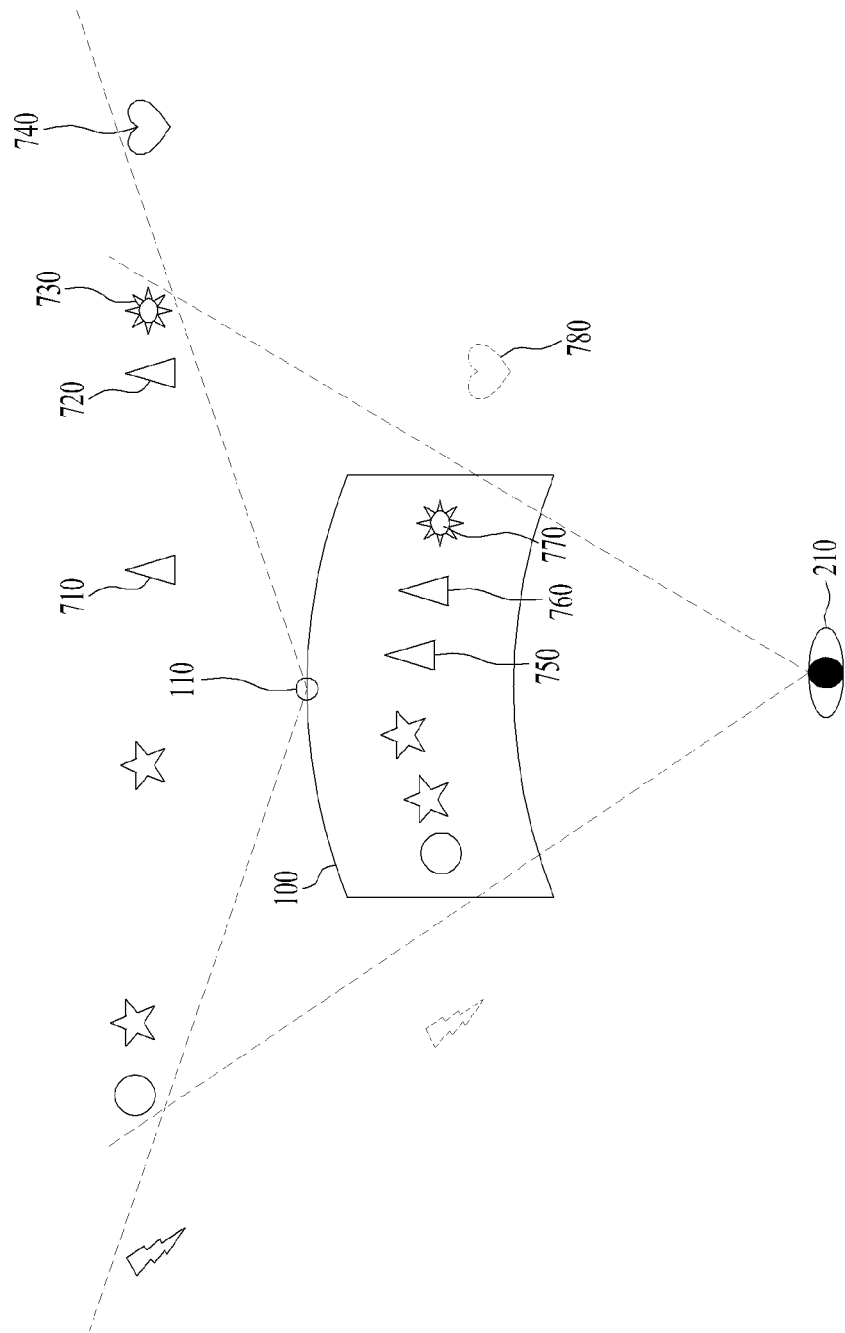

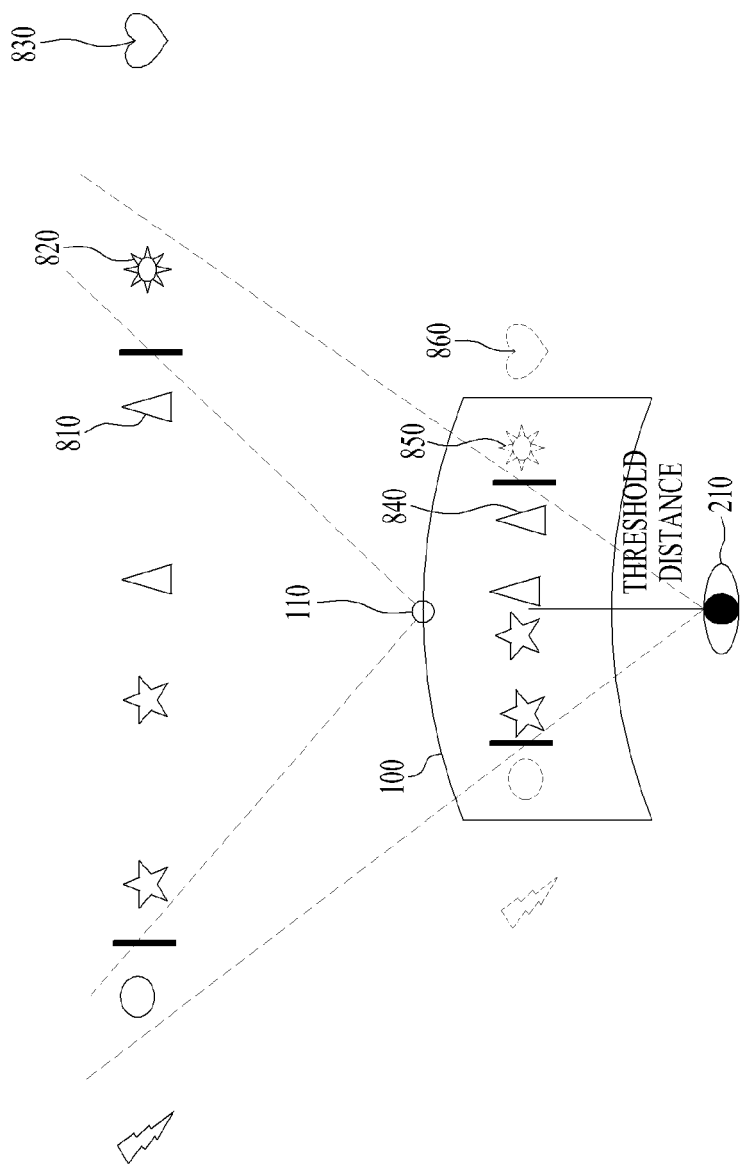

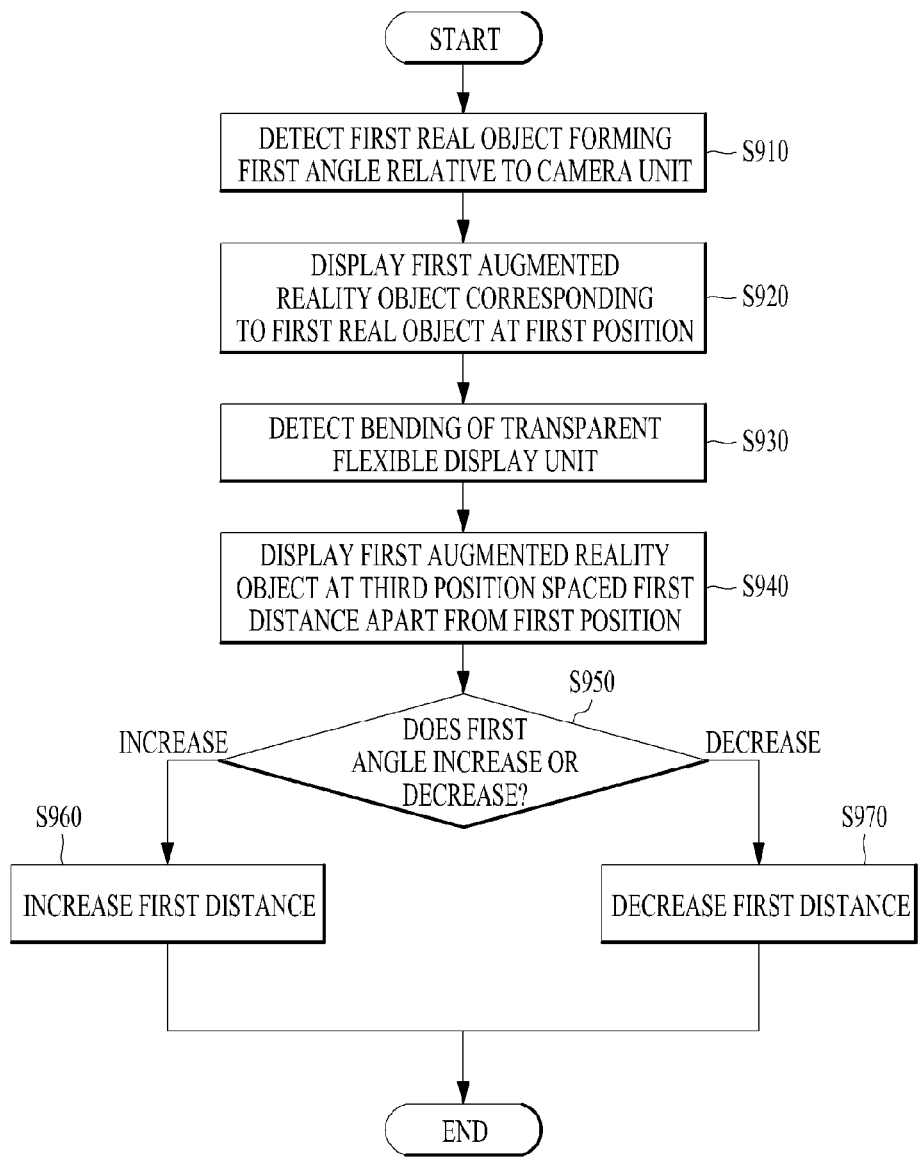

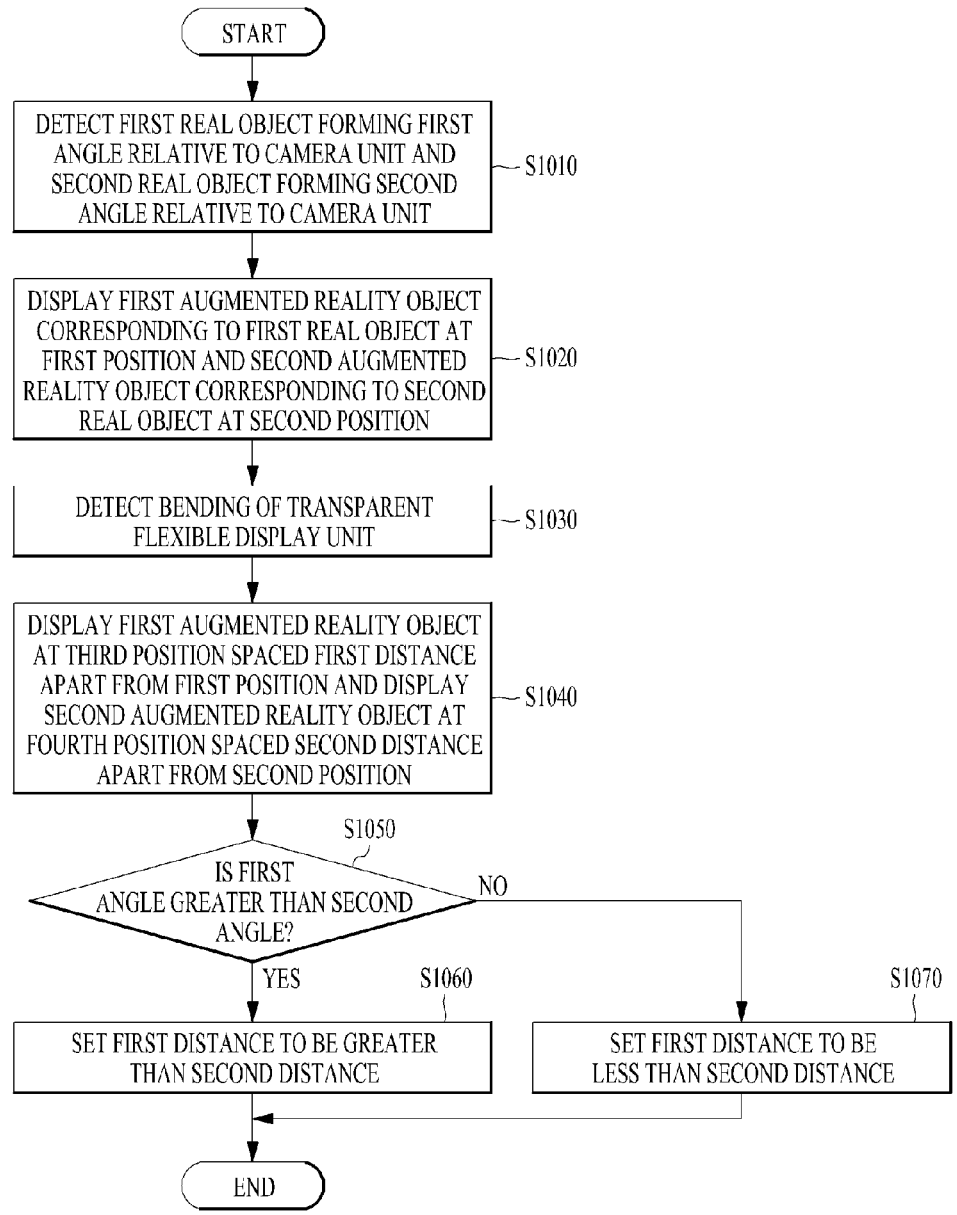

DISPLAY SYSTEM FOR DISPLAYING AUGMENTED REALITY IMAGE AND CONTROL METHOD FOR THE SAME

This application claims the benefit of the Korean Patent Application No. 10-2014-0017876, filed on Feb. 17, 2014, which is hereby incorporated by reference as if fully set forth herein.

BACKGROUND OF THE INVENTION

1. Field of the Invention

The present disclosure relates to a display system for displaying augmented reality images and a control method for the same. More particularly, the present disclosure relates to a method for a display system to control, upon detecting bending of a transparent flexible display unit, the position to display an augmented reality image based on the angle of bending.

2. Discussion of the Related Art

Augmented reality technology employing a mixture of a real object and a virtual object allows a user to view a real object along with an augmented reality object, thereby providing realism and additional information. For example, when a real environment around a camera of a smartphone is shown on the camera, augmented reality objects such as positions and phone numbers of nearby stores are stereoscopically displayed along with real objects. Augmented reality technology is applicable to a display system including a transparent flexible display. More specifically, a user may detect a real object through a transparent display unit. The display system may display an augmented reality object corresponding to the detected real object on the transparent flexible display unit. In addition, the flexible display unit may be bendable. The display system may display the augmented reality object on the transparent flexible display unit based on the angle of bending.

Accordingly, in the case that a display system including a transparent flexible display unit employs the augmented reality technology, a method for the display system to display an augmented reality object corresponding to the real object on the transparent flexible display unit based on transparency and flexibility.

SUMMARY OF THE INVENTION

Accordingly, the present disclosure is directed to a display system for displaying an augmented reality image and a control method for the same which substantially obviate one or more problems due to limitations and disadvantages of the related art.

An object of the present invention is to provide a method for a display system to detect a real object and display an augmented reality object on a transparent flexible display unit based on the angle of the detected real object relative to a camera unit.

Another object of the present invention is to provide a method for a display system to control, upon detecting bending of a transparent flexible display unit, the position to display an augmented reality object on the transparent flexible display unit based on the angle of bending.

Another object of the present invention is to provide a method for a display system to control, upon detecting a distance between a user's eye and a transparent flexible display unit, the position to display an augmented reality object based on the detected distance.

Another object of the present invention is to provide a method for a display system to display an indicator indicating a limit of a region to display an augmented reality object based on the viewing angle of a camera unit.

Another object of the present invention is to provide a display system configured with a head mounted display (HMD) device and a display unit.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims thereof as well as the appended drawings.

To achieve these objects and other advantages and in accordance with the purpose of the present disclosure, as embodied and broadly described herein, a display system including a camera unit configured to detect a real object positioned within a viewing angle, a transparent flexible display unit configured to display an augmented reality object based on the real object, a bending sensor unit configured to detect bending of the transparent flexible display unit, a processor configured to control the camera unit, the transparent flexible display unit and the bending sensor unit, wherein the processor displays, at a first position on the transparent flexible display unit, a first augmented reality object corresponding to a first real object forming a first angle relative to the camera unit, and displays, at a second position on the transparent flexible display unit, a second augmented reality object corresponding to a second real object forming a second angle relative to the camera unit, wherein, upon detecting bending of the transparent flexible display unit, the processor displays the first augmented reality object at a third position spaced a first distance apart from the first position, and displays the second augmented reality object at a fourth position spaced a second distance apart from the second position, wherein, when the first angle is greater than the second angle, the first distance is set to be greater than the second distance.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the present disclosure and are incorporated in and constitute a part of this application, illustrate embodiment(s) of the invention and together with the description serve to explain the principle of the invention. In the drawings:

FIG. 2 is a view illustrating a method for the display system to display an augmented reality object upon detecting bending of the transparent flexible display unit according to one embodiment;

FIG. 3 is a view illustrating a method for the display system to set the position to display an augmented reality object based on the angle of a real object relative to the user's eye according to one embodiment;

FIGS. 4A to 4C are views illustrating a method for displaying an augmented reality object based on the distance between the transparent display unit and the user's eye according to one embodiment;

FIGS. 7A and 7B are views illustrating a method for a display system to display an augmented reality object based on the viewing angle of a camera unit, according to one embodiment;

FIG. 8 is a view illustrating a method for a display system to display an augmented reality object based on the distance between a user's eyes and a flexible transparent flexible unit, according to one embodiment;

FIG. 9 is a view illustrating a method for controlling a display system according to one embodiment;

FIG. 10 is a view illustrating a method for controlling a display system according to one embodiment.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. However, the scope of the present disclosure is not limited to the embodiments.

Although the terms used in this specification are selected, as much as possible, from general terms that are widely used in the art at present while taking into consideration of the functions, these terms may be replaced by other terms according to intentions of those skilled in the art, customs, emergence of new technologies, or the like. In addition, in a specific case, terms that are arbitrarily selected by the applicant may be used. In this case, meanings of these terms may be disclosed in corresponding description parts of this specification. Accordingly, it should be noted that the terms used herein should be construed based on practical meanings thereof and the whole content of this specification, rather than being simply construed based on names of the terms.

In the present disclosure, a display system 100 may represent a system capable of displaying visual information. For example, the display system 100 may be a smart phone, a smart pad, a tablet, a desktop computer, a laptop computer, or a personal digital assistant (PDA). In addition, the display system 100 may include a head mounted display (HMD) device. In addition, the display system 100 may be a device for displaying visual information. However, embodiments are not limited thereto.

According to the present disclosure, the display system 100 may be a device that displays an augmented reality object corresponding to a real object. The real object may represent an object that the user recognizes through the display system 100. In addition, an augmented reality object may represent a virtual image produced in accordance with the real object detected by the display system 100.

Figure 1:
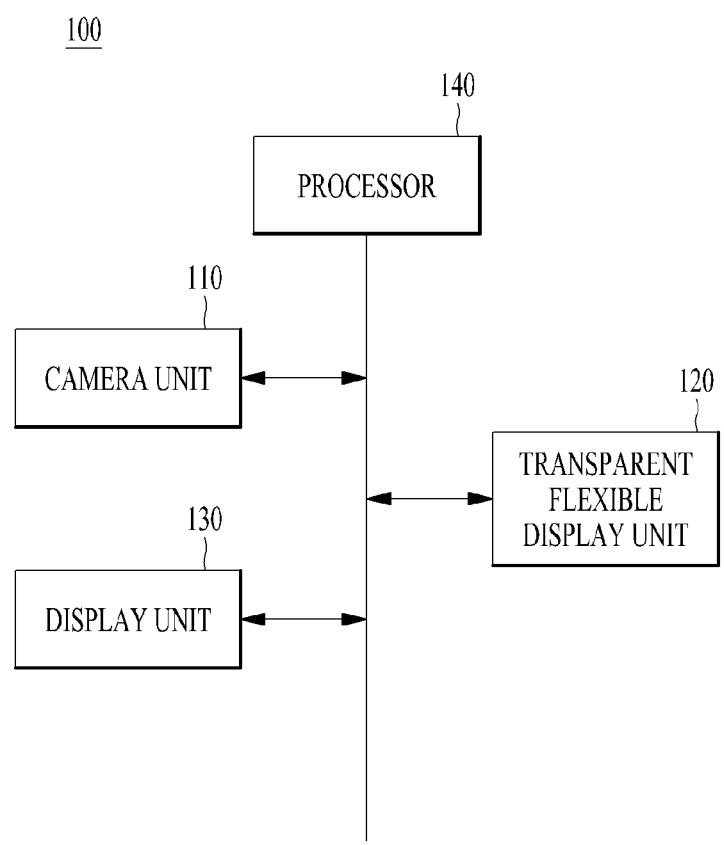
FIG. 1 is a block diagram illustrating the display system according to an exemplary embodiment of the present disclosure.

FIG. 1 is a block diagram illustrating the display system 100 according to an exemplary embodiment of the present disclosure. The display system 100 may include a camera unit 110, a transparent flexible display unit 120, a bending sensor unit 130 and a processor 140. The camera unit 110 captures an image of the surroundings of the HMD device 100 and converts the captured image into an electrical signal. To this end, the camera unit 110 may include an image sensor. The image sensor may convert an optical signal into an electrical signal.

The image captured and converted into an electrical signal by the camera unit 110 may be stored in a storage unit (not shown) and then be displayed on a transparent flexible display unit 120 using the processor 140. In addition, the image may be displayed on the transparent flexible display unit 120 using the processor 140, without being stored. In addition, the camera unit 110 may have a viewing angle. Herein, the viewing angle may represent an angle of a region allowing the camera unit 110 to detect a real object positioned around the camera unit 110. The camera unit 110 may detect only real objects positioned within the viewing angle. In the case that a real object is positioned within the viewing angle of the camera unit 110, the display system 100 may display an augmented reality object corresponding to the real object. In addition, the camera unit 110 may detect an angle of the real object relative to the camera unit 110. More specifically, the camera unit 110 may detect the angle of the real object relative to the center of the camera unit 110. Herein, the angle of the real object relative to the camera unit 110 may be a rightward, leftward, upward, or downward angle about the center of the camera unit 110. In addition, for example, the camera unit 110 may be positioned on a vertical axis passing through the center of the transparent flexible display unit 120. More specifically, the camera unit 110 may be positioned at the uppermost part of the vertical axis passing through the center point of the transparent flexible display unit 120. To this end, the camera unit 110 may maintain a certain angle relative to the real object regardless of bending of the transparent flexible display unit 120.

In addition, the angle of the real object relative to the camera unit 110 may be determined further based on a line connecting the center of the transparent flexible unit 120 and the line of the user's gaze. More specifically, the camera unit 110 may detect position information about the user's eyes and the transparent flexible display unit 120. Herein, position information may include the distance and angle of the user's eyes relative to the transparent flexible display unit 120. The camera unit 110 may detect the angle of the real object relative to the camera unit 110, in consideration of the position information. In addition, the camera unit 110 may include, for example, a sensor unit configured to detect real objects. The sensor unit may detect the distance and angle of the real object relative to the camera unit 110.

The transparent flexible display unit 120 may output visual information based on content executed by the processor 140 or a control command of the processor 140. The visual information may be a real object and an augmented reality object. Herein, the transparent flexible display unit 120 may be a see-through display. The user may detect a real object through the transparent flexible display unit 120. That is, the transparent flexible display unit 120 may display a real object that the user views through the transparent flexible display unit 120 and an augmented reality object corresponding to the real object.

In addition, the transparent flexible display unit 120 may be formed of a flexible material. More specifically, the transparent flexible display unit 120 may be bent by the user. In the case that the display system 100 detects bending of the transparent flexible display unit 120, the display system 100 may display an augmented reality object corresponding to the real object based on the angle of bending. Herein, the angle of bending may be set with respect to the position at which the transparent flexible display unit 120 is straightened. The angle of bending may vary with position within the transparent flexible display unit 120. For example, the angle of bending may be an average of angle of bendings at respective positions within the transparent flexible display unit 120. In addition, the angle of bending may be a angle of bending at a point within the transparent flexible display unit 120 where the augmented reality object is displayed. In addition, in the case that the user bends the transparent flexible display unit 120 to a large extent, the angle of bending may increase. However, embodiments are not limited thereto. In addition, the display system 100 may change and set the position to display the augmented reality object based on the angle of bending.

In addition, the transparent flexible display unit 120 may be provided with high flexibility by being implemented according to display technologies such as liquid crystal display (LCD) technology, organic light emitting diode (OLED) technology, electro luminescent display (ELD) technology, or electronic paper technology. The transparent flexible display unit 120 is physically deformable. Accordingly, when a flexible display 170 is accommodated at an accommodation position, it may not increase the overall size of the display system 100.

Preferably, the transparent flexible display unit 120 may be a touch sensitive display screen provided with a flexible display screen and touch input recognition sensor. Accordingly, the transparent flexible display unit 120 may detect touch input.

In addition, the transparent flexible display unit 120 may be configured as a separate display unit (not shown). More specifically, the display system 100 may be configured with a device including the camera unit 110 and the bending sensor unit 130 and a display unit including the transparent flexible display unit 120. For example, the display system 100 may be configured with an HMD device including the camera unit 110 and the bending sensor unit 130 and a display unit including the transparent flexible display unit 120. In this case, the user may use the HMD device to detect a real object. In addition, the user may display an augmented reality object corresponding to the detected real object on the display unit including the transparent flexible display unit 120. Thereby, the user may control the augmented reality object displayed on the transparent flexible display unit 120. A relevant description will be given later with reference to FIGS. 8A and 8B.

In addition, the device including the camera unit 110 and bending sensor unit 130 may be at least one of a smart phone, a smart pad, a tablet, a desktop computer, a laptop computer, and a PDA. In addition, the transparent flexible display unit 120 may be constructed as a display unit separately from the aforementioned device.

The bending sensor unit 130 may use a plurality of sensors mounted to the display system 100 to detect bending of the transparent flexible display unit 120 and transfer the angle of bending to the processor 140. In addition, the bending sensor unit 130 may detect the bending direction of the transparent flexible display unit 120. Herein, the bending direction may be a direction in which bending occurs with respect to a vertical axis passing through the center of the transparent flexible display unit 120. In this case, the bending direction may be an inward direction directed toward the user. In addition, the bending direction may be an outward direction directed away from the user. In addition, the bending direction may be a direction in which bending occurs with respect to a horizontal axis passing through the center of the transparent flexible display unit 120. In this case, the bending direction may be an inward direction directed toward the user. In addition, the bending direction may be an outward direction directed away from the user.

The bending sensor unit 130 may include a plurality of sensing means. Examples of the sensing means may include a gravity sensor, a geomagnetic sensor, a motion sensor, a gyro sensor, an acceleration sensor, an inclination sensor, a brightness sensor, an altitude sensor, an olfactory sensor, a temperature sensor, a depth sensor, a pressure sensor, a bending sensor, an audio sensor, a video sensor, a global positioning system (GPS) sensor, a touch sensor, etc. The bending sensor unit 130, which is a general term for such various sensing means, may sense various user inputs and user environments and transfer sensing results to the device to allow the device to perform corresponding operations. The aforementioned sensors may be included in the device as separate elements, or may be included in the device by being integrated into at least one element.

The processor 140 may use information about the real object received through the camera unit 110 to display an augmented reality object on the transparent flexible display unit 120. At this time, the processor 140 may detect the angle of the real object relative to the camera unit. In addition, the processor 140 may detect, for example, the angle of the real object relative to the user's eyes. At this time, the angle may be set based on a line (hereinafter, reference line) connecting the user's eye with the center of the transparent flexible display unit 120. In addition, the angle may be a rightward, leftward, upward, or downward angle with respect to the reference line However, embodiments are not limited thereto. The processor 140 may display an augmented reality object corresponding to the real object on the transparent flexible display unit 120 based on the angle of the real object relative to the camera unit. At this time, the transparent flexible display unit 120 may display the augmented reality object based on the point of intersection between the line of gaze of the user's eye viewing the real object and the transparent flexible display unit. The processor 140 may receive information about bending of the transparent flexible display unit 120 from the bending sensor unit 130. The processor 140 may display the augmented reality object corresponding to the real object based on the angle of bending of the transparent flexible display unit 120. At this time, the processor may display the augmented reality object based on the point of intersection between the line of gaze of the user viewing the real object and the bent transparent flexible display unit 120.

In addition, the display system 100 may include a sensor unit (not shown). The sensor unit may detect the angle of the real object relative to the user's eye. More specifically, the sensor unit may detect the position information about the display system 100 and the user's eye. Herein, the position information may be the distance and angle of the display system 100 relative to the user's eye. In addition, the sensor unit may detect the position information about the display system 100 and the real object. Herein, the position information may be the distance and angle of the real object relative to the display system 100. Under such conditions, the sensor unit may detect the angle of the real object relative to the user's eye and transfer the detected information to the processor 140. Herein, the sensor unit may, for example, be included in the processor 140. In addition, the sensor unit may be included in the aforementioned bending sensor unit, or may be integrated with at least one element.

In addition, the sensor unit may be a distance measurement sensor unit. More specifically, the sensor unit may include at least one of a proximity sensor, an infrared sensor, an ultrasound sensor, an inclination sensor and an illumination sensor. In addition, the sensor unit may be a sensor capable of measuring distance. However, the sensor unit is not limited to the above examples.

FIG. 2 is a view illustrating a method for the display system 100 to display an augmented reality object upon detecting bending of the transparent flexible display unit 120 according to one embodiment.

The display system 100 may display an augmented reality object corresponding to the real object on the transparent flexible display unit 120. More specifically, the display system 100 may detect a real object with the camera unit 110. The display system 100 may detect the line of gaze of the user's eye viewing the detected real object. For example, the display system 100 may detect the line of gaze of the user viewing the real object using a sensor unit. The display system 100 may display the augmented reality object based on the point of intersection between the line of gaze of the user viewing the real object and the transparent flexible display unit 120. At this time, the display system 100 may detect a plurality of real objects. The display system 100 may detect the line of gaze of the user viewing a plurality of real objects. The display system 100 may display a plurality of augmented reality objects based on the point of intersection between the line of the user's gaze and the transparent flexible display unit 120.

In addition, the display system 100 may detect bending of the transparent flexible display unit 120. When the display system 100 detects bending of the transparent flexible display unit 120, the display system 100 may display an augmented reality object corresponding to the real object based on the angle of bending. More specifically, the user may detect real objects through the transparent display unit 120. The display system 100 may display augmented reality objects based on the point of intersection between the line of the user's gaze and the transparent flexible display unit 120. In the case that bending of the transparent flexible display unit 120 is detected, the display system 100 may change the point of intersection between the line of gaze directed to a real object and the transparent flexible display unit 120 based on the angle of bending. The display system 100 may change the position where an augmented reality object corresponding to the real object is displayed. Thereby, the user is allowed to view the augmented reality object corresponding to the real object without changing the user's gaze even when the transparent flexible display unit 120 is bent.

More specifically, referring to FIG. 2, the display system 100 may, for example, display a first augmented reality object 250 corresponding to a first real object 220 on the transparent flexible display unit 120. At this time, the first augmented reality object 250 may be displayed at the point of intersection between the line of gaze of the user viewing the real object and the transparent display unit 120. In addition, the display system 100 may display a second augmented reality object 260 corresponding to a second real object 230. In addition, the display system 100 may display a third augmented reality object 270 corresponding to a third real object 240. At this time, in the case that the display system 100 detects bending of the transparent flexible display unit 120, the display system 100 may change the position of the first augmented reality object 250 and display the first augmented reality object 250. At this time, the display system 100 may change the position of the first augmented reality object 250 to a point at which the line of the user's gaze viewing the real object and the first real object 220 intersects and display the first augmented reality object 250. In addition, the display system 100 may change the position of the second augmented reality object 260 and third augmented reality object 270 and display the second augmented reality object 260 and third augmented reality object 270.

According to one embodiment of the present disclosure, the display system 100 may detect the bending direction of the transparent flexible display unit 120. Herein, the bending direction may be determined based on the horizontal or vertical reference line passing through the center point of the transparent flexible display unit 120. In addition, the bending direction may be an inward direction directed toward the user's eye or an outward direction directed away from the user's eye. At this time, the display system 100 may change the position where the augmented reality object is displayed, based on the bending direction and angle of bending. That is, the display system 100 may display the augmented reality object based on the point of intersection between the bent transparent flexible display unit 120 and the line of gaze of the user viewing the real object.

FIG. 3 is a view illustrating a method for the display system 100 to set the position to display an augmented reality object based on the angle of a real object relative to the user's eye according to one embodiment.

The display system 100 may display an augmented reality object corresponding to a real object on the transparent flexible display unit 120. The display system 100 may detect the bending of the transparent flexible display unit 120. In the case that the display system 100 detects bending of the transparent flexible display unit 120, the display system 100 may change the position of the augmented reality object corresponding to the real object and display the augmented reality object. More specifically, the display system 100 may display the augmented reality object based on the point of intersection between the line of the user's gaze directed to the real object and the transparent flexible display unit 120. In the case that the display system 100 detects bending of the transparent flexible display unit 120, the display system 100 may display the augmented reality object based on the point of intersection between the line of the user's gaze directed to the real object and the bent transparent flexible display unit 120. That is, in the case that the display system 100 detects bending of the transparent flexible display unit 120, the display system 100 may change the position of the augmented reality object and display the augmented reality object. At this time, the display system 100 may change the position to display the augmented reality object based on the angle of the real object relative to the user's eye.

In the case that the angle of the real object relative to the user's eye increases, the display system 100 may display the augmented reality object corresponding to the real object at a position far apart from the center of the transparent flexible display unit 120. At this time, the degree of bending of the transparent flexible display unit 120 may vary with position on the transparent flexible display unit 120. When the transparent flexible display unit 120 is bent, a farther position from the center point of the transparent flexible display unit 120 has a greater angle of bending. At this time, the angle of bending may increase from the center of the transparent flexible display unit 120 to the edge thereof. In the case that the angle of bending of the transparent flexible display unit 120 increases, the display system 100 may display the augmented reality object at a farther position than before the transparent flexible display unit 120 is bent. Accordingly, in the case that the angle of the real object relative to the user's eye increases, the display system 100 may display the augmented reality object at a farther position than when bending does not occur. That is, the display system 100 may adjust the position of the displayed augmented reality object based on the angle of the real object relative to the user's eye.

According to one embodiment illustrated in FIG. 3, the display system 100 may detect a first real object 310 forming a first angle relative to a user's eye 210. The display system 100 may display a first augmented reality object 330 corresponding to the first real object 310 at a first position, based on the first angle. Herein, the first position may be determined based on a point at which the line of gaze of the user's eye 210 viewing the first real object 310 and the transparent flexible display unit 120 intersect. In addition, a second real object 320 forming a second angle relative to a user's eye 210. The display system 100 may display a second augmented reality object 340 corresponding to the second real object 320 at a second position, based on the second angle. Herein, the second position may be determined based on a point at which the line of gaze of the user's eye 210 viewing the second real object 320 and the transparent flexible display unit 120 intersect. At this time, in the case that the first angle is greater than the second angle, the first position may be positioned farther from the center of the transparent flexible display unit 120 than the second position. The display system 100 may detect bending of the transparent flexible display unit 120. In the case that the display system 100 detects bending of the transparent flexible display unit 120, the display system 100 may display the first augmented reality object 330 at a third position, based on the angle of bending. At this time, the third position may be determined based on a point at which the line of gaze of the user's eye 210 viewing the first real object 310 and the bent transparent flexible display unit 120 intersect. In addition, the third position may be spaced a first distance apart from the first position. For example, the third position may be spaced the first distance apart from the first position toward the center of the transparent flexible display unit 120. In addition, the third position may be spaced the first distance apart from the first position toward the opposite side of the center point of the transparent flexible display unit 120.

In addition, the display system 100 may display the second augmented reality object 340 at a fourth position based on the angle of bending. At this time, the fourth position may be determined based on a point at which the line of gaze of the user's eye 210 viewing the second real object 320 and the bent transparent flexible display unit 120 intersect. In addition, the fourth position may be spaced a second distance apart from the second position. For example, the fourth position may be spaced the second distance apart from the second position toward the center of the transparent flexible display unit 120. In addition, the fourth position may be spaced the second distance apart from the second position toward the opposite side of the center of the transparent flexible display unit 120. A detailed description will be given later with reference to FIGS. 4A and 4B.

At this time, in the case that the first angle is greater than the second angle, the first distance may be greater than the second distance. More specifically, as described above, the first position may be positioned farther from the center of the transparent flexible display unit 120 than the second position. At this time, the angle of bending may increase from the center of the transparent flexible display unit 120 to the edge thereof. In addition, as the angle of bending increases, the display system 100 may display the augmented reality object at a farther point than the point at which the augmented reality object is displayed before bending. Accordingly, in the case that the first angle is greater than the second angle, the first distance may be greater than the second distance. That is, as the angle of a real object relative to the user's eye 210 increases, the display system may display the corresponding augmented reality object at a position farther from the position where the augmented reality object has been displayed before bending.

Figure 4A:
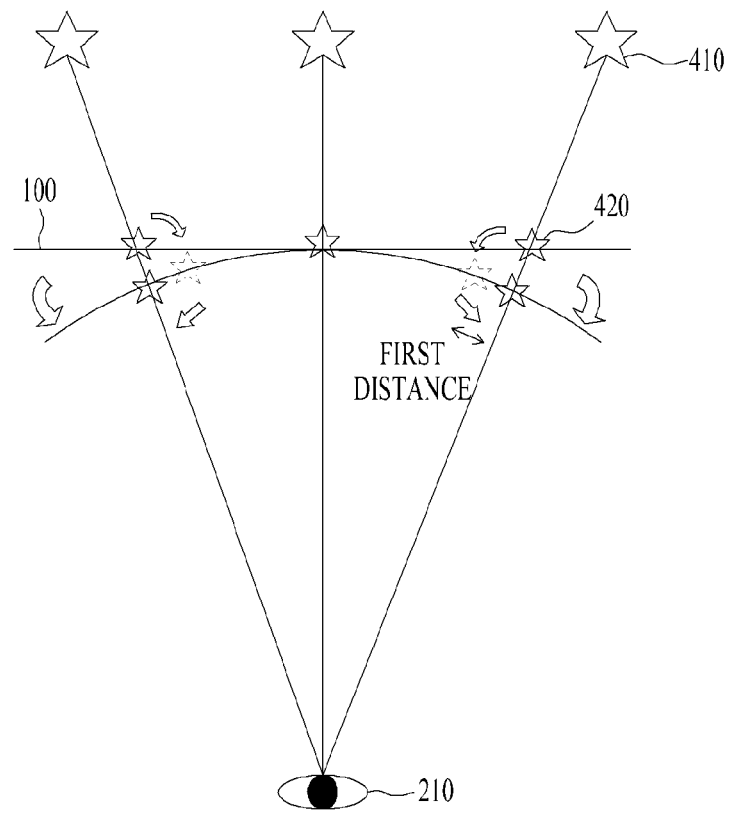
Figure 4B:
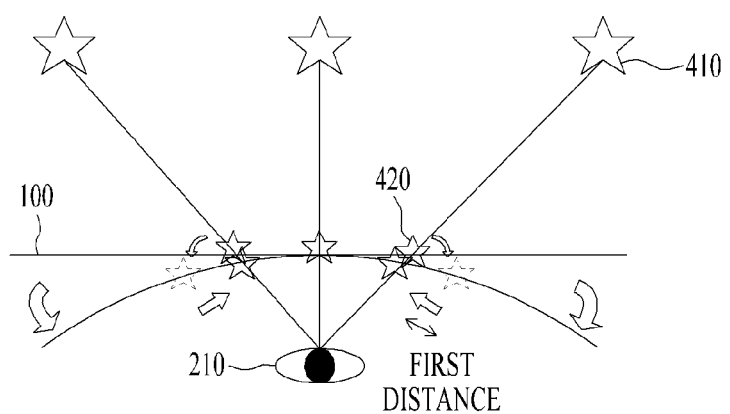

FIGS. 4A to 4C are views illustrating a method for displaying an augmented reality object based on the distance between the transparent display unit 120 and the user's eye according to one embodiment.

The display system 100 may display the augmented reality object based on the point of intersection between the line of gaze of the user's eye 210 viewing a real object and the transparent flexible display unit 120. At this time, the display system 100 may display a corresponding augmented reality object based on the position of the user's eye 210. More specifically, in the case that the display system 100 detects bending of the transparent flexible display unit 120, the display system 100 may change the position of the augmented reality object and display the augmented reality object. At this time, in the case that the distance between the user's eye 210 and the transparent flexible display unit 120 is less than or equal to a threshold distance, the display system 100 may display the augmented reality object at a position closer to the inside than the position where the augmented reality object is displayed before bending occurs. In the case that the distance between the user's eye 210 and the transparent flexible display unit 120 exceeds the threshold distance, the display system 100 may display the augmented reality object at a position farther to the outside than the position where the augmented reality object is displayed before bending occurs. At this time, the display system 100 may determine the inside and the outside based on the center of the transparent flexible display unit 120. More specifically, the inside may be a position shifted closer to the center of the transparent flexible display unit 120. The outside may be a position shifted closer to the edge of the transparent flexible unit 120 toward the opposite side of the center of the transparent flexible display unit 120. That is, the display system 100 may determine that the center of the transparent flexible unit 120 is the innermost position. In addition, the display system 100 may determine that the edge of the transparent flexible unit 120 is the outermost position. In addition, the threshold distance may be a critical distance at which the position of the displayed augmented reality object is changed. In addition, the threshold distance may be set to have a certain margin of error.

For example, the threshold distance may be determined based on bending of the transparent flexible display unit 120. In addition, the threshold distance may be determined based on the angle of the real object relative to the camera unit 110. Threshold distance may be determined further based on the angle of the real object relative to the user's eye 210.

More specifically, the threshold distance may be determined in consideration of the angle of bending of the transparent flexible unit 120 and the positions of the camera unit 110 and the real object. The threshold distance may be set to the distance at which the position of the augmented reality object displayed before bending, the position of the augmented reality object displayed after bending, and the user's eye 210 are aligned on the same line.

Referring to FIGS. 4A to 4C, the display system 100 may display a first augmented reality object 420 corresponding to a first real object 410 at a first position. Herein, the first position may be determined based on a point at which the line of gaze of the user's eye 210 viewing the first real object 410 and the transparent flexible display unit 120 intersect. For example, the first position may be determined based on the point of intersection between the line of gaze of the user's eye 210 viewing the first real object 410 and the transparent flexible display unit 120. For example, the first position may be the point of intersection between a line connecting the center of the user's left eye and right eye with the first real object 410 and the transparent flexible display unit 120. In the case that the first augmented reality object 420 is displayed in three dimensions, the first position may be determined by the distance and angle of the user's left eye relative to the first real object 410 and the distance and angle of the user's right eye relative to the first real object 410. That is, the first position may be changed and set by the display system 100, based on the user's eyes.

In addition, in the case that the display system 100 detects bending of the transparent flexible display unit 120, the display system may display the first augmented reality object 420 at a second position. Herein, the second position may be determined based on the point of intersection between the line of gaze of the user's eye 210 viewing the first real object 410 and the bent transparent flexible display unit 120. At this time, in the case that the user's eye is detected at a position distant from the transparent flexible display unit 120, the display system 100 may display the augmented reality object at the second position spaced a first distance apart from the first position toward the outside. That is, the first distance may be the distance from the first position to a position spaced apart from the first position toward the opposite side of the center of the transparent flexible display unit 120.

On the other hand, in the case that the user's eye is detected at a position close to the transparent flexible display unit 120, the display system may display the augmented reality object at a second position spaced the first distanced from the first position to the inside. That is, the first distance may be the distance from the first position to a position spaced apart from the first position in the direction toward the center of the transparent flexible display unit 120.

More specifically, in the case that the distance between the user's eye 210 and the transparent flexible display unit 120 exceeds the threshold distance, the display system 100 may display the augmented reality object at a second position spaced a first distance apart from the first position to the outside. In the case that the distance between the user's eye 210 and the transparent flexible display unit 120 is less than or equal to the threshold distance, the display system 100 may display the augmented reality object at a second position spaced the first distance apart from the first position to the inside. Herein, the threshold distance may be a critical distance that allows change of the position of the displayed augmented reality object. The threshold distance may be determined by the degree of bending of the transparent flexible display unit 120 and the angle of the first real object 410 relative to the camera unit 120. More specifically, the threshold distance may be the distance between the transparent flexible unit 120 and the user's eye 210 when the user's eye 210, the first position, the second position and the first real object 410 are positioned on the same line. That is, the threshold distance may be set in consideration of the degree of bending of the transparent flexible display unit 120 and the first real object 410 relative to the camera unit 110.

Figure 5A:
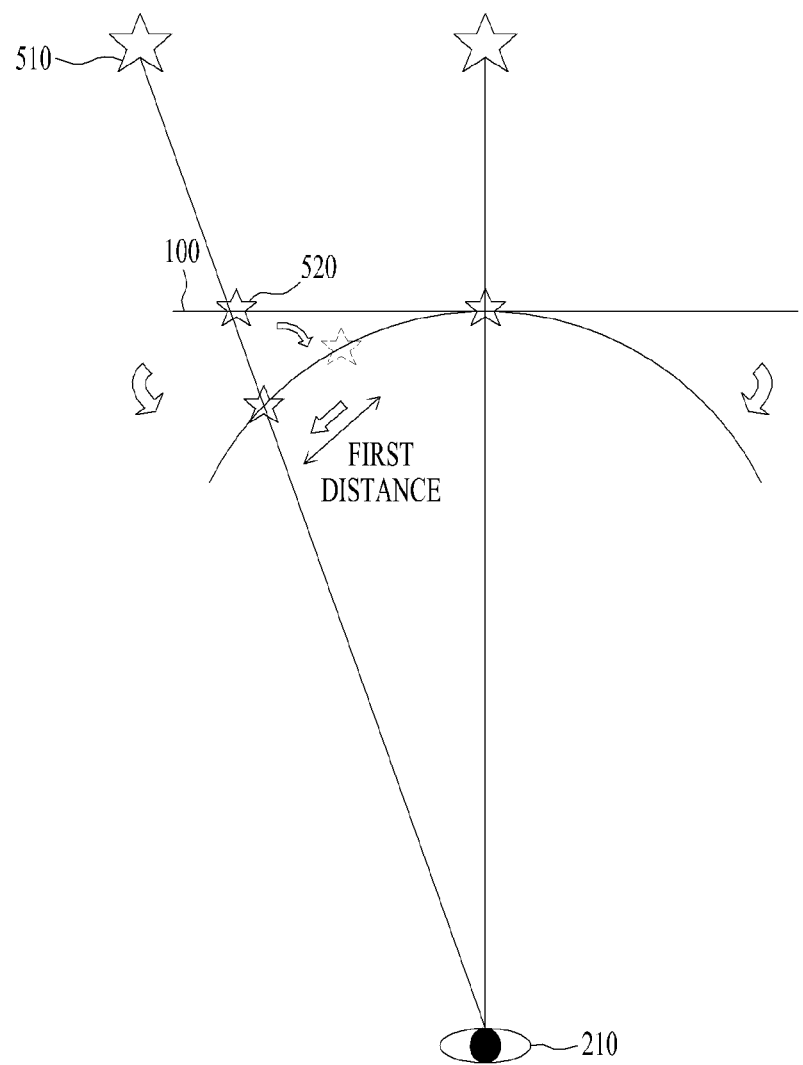
FIGS. 5A and 5B are views illustrating a method for the display system to display an augmented reality object based on bending of the transparent flexible display unit.
Figure 5B:
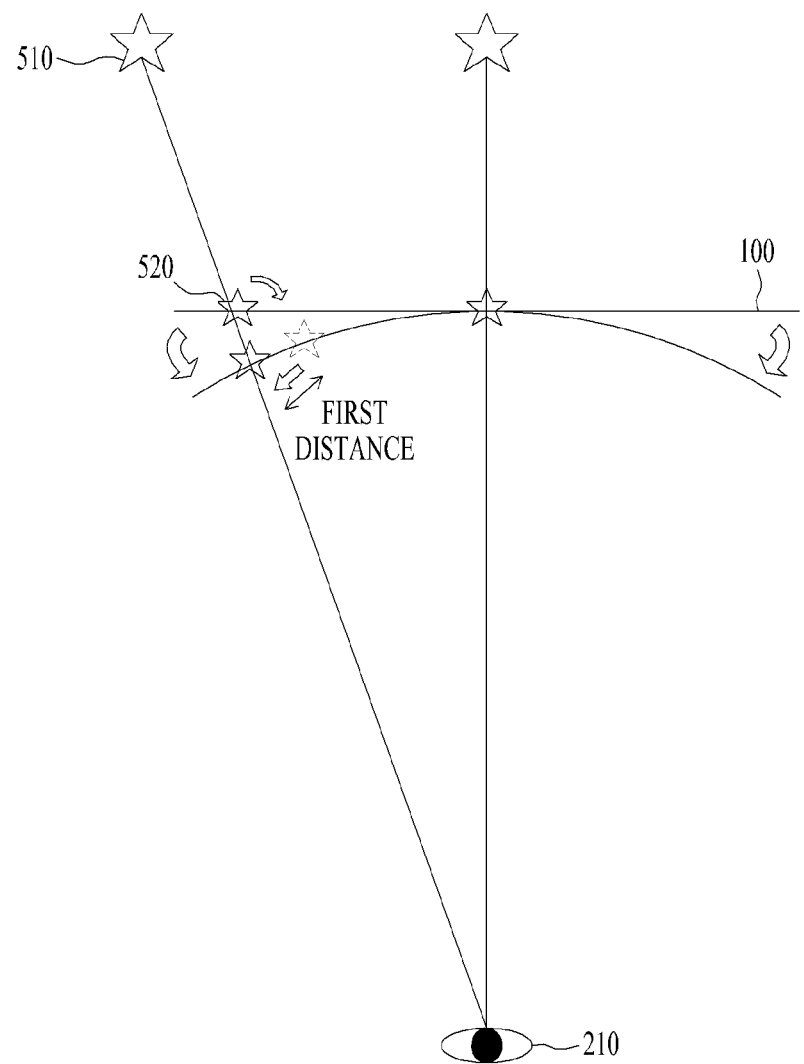

FIGS. 5A and 5B are views illustrating a method for the display system 100 to display an augmented reality object based on bending of the transparent flexible display unit 120.

In the case that the display system 100 detects bending of the transparent flexible display unit 120, the display system 100 may change the position of the augmented reality object and display the augmented reality object. At this time, the display system 100 may change the position where the augmented reality object is displayed, based on the point of intersection between the bent transparent flexible display unit 120 and the line of gaze of the user's eye 210 viewing the real object. Accordingly, the display system 100 may change the position where the augmented reality object is displayed, based on bending of the transparent flexible display unit 120.

More specifically, the display system 100 may determine the position to display the augmented reality object based on the angle of bending of the transparent flexible display unit 120. Herein, the angle of bending may vary with position within the transparent flexible display unit 120. For example, the angle of bending may be an average of angle of bendings at respective positions within the transparent flexible display unit 120. In addition, the angle of bending may be a angle of bending at a point within the transparent flexible display unit 120 where the augmented reality object is displayed. In addition, the angle of bending may increase when the transparent flexible display unit 120 is further bent. However, embodiments are not limited thereto.

In the case that the angle of bending of the transparent flexible display unit 120 increases, the display system 100 may display the augmented reality object at a position shifted closer to the edge of the transparent flexible display unit 120. More specifically, the augmented reality object may be displayed based on the point of intersection between the bent transparent flexible display unit 120 and the line of gaze of the user's eye 210 viewing a real object. Accordingly, in the case that the angle of bending of the transparent flexible display unit 120, the augmented reality object may be displayed at a position closer to the edges of the transparent flexible display unit 120.

In addition, the display system 100 may determine the position to display an augmented reality object based on the bending direction of the transparent flexible display unit 120.

For example, in the case that the angle of bending increases and thus the point of intersection between the line of gaze of the user's eye 210 viewing a real object and the transparent flexible display unit 120 does not exist, the display system 100 may display an indicator. At this time, the indicator may indicate that the augmented reality object cannot be displayed. The display system may transfer feedback. Herein, the feedback may include at least one of visual feedback, audio feedback and tactile feedback. The feedback may indicate that the augmented reality object cannot be displayed.

For example, referring to FIGS. 5A and 5B, the display system 100 may display a first augmented reality object 520 corresponding to a first real object 510 at a first position. At this time, in the case that the display system 100 detects bending of the transparent flexible display unit 120, the display system 100 may display the first augmented reality object 520 at a second position. The second position may be determined based on the point of intersection between the line of gaze of the user's eye 210 viewing first real object 510 and the transparent flexible display unit 120. In addition, the second position may be spaced a first distance apart from the first position.

At this time, in the case that the angle of bending of the transparent flexible display unit 120 increases, the display system 100 may set the first distance to be greater. That is, as the angle of bending increases, the display system 100 may set the second position to be farther from the first position. At this time, in the case that the angle of bending increases and the second position does not exist on the transparent flexible display unit 120, the display system 100 may display an indicator indicating that the first augmented reality object 520 cannot be displayed. In addition, the display system 100 may transfer, to the user, feedback indicating that the first augmented reality object 520 cannot be displayed.

Figure 6A:
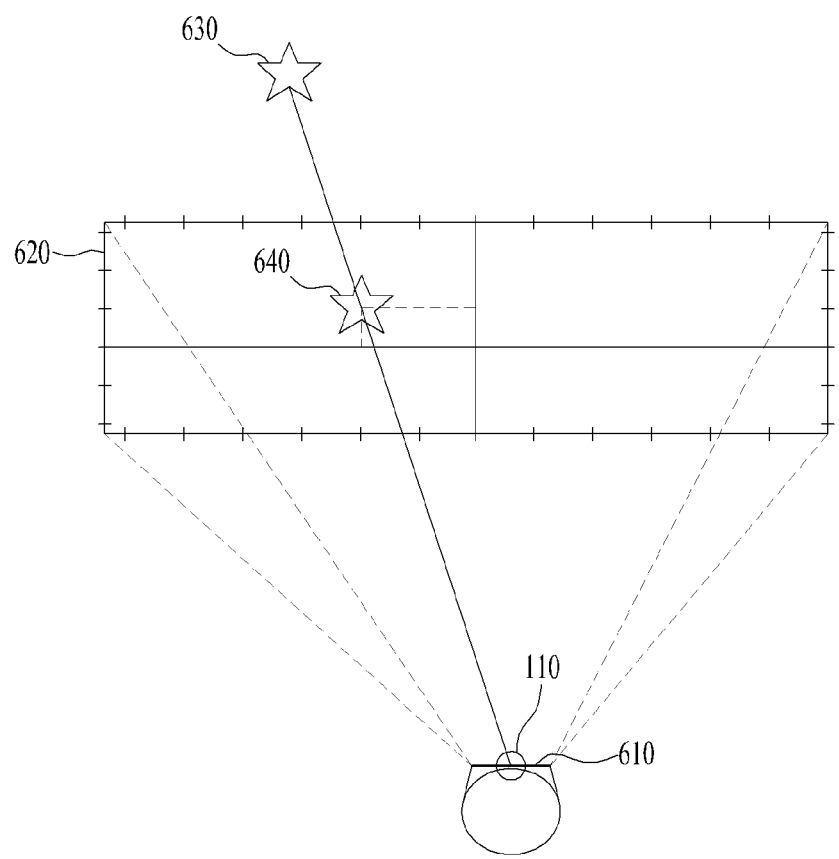
FIGS. 6A and 6B are views illustrating a display system including an HMD device according to one embodiment of the present disclosure.
Figure 6B:
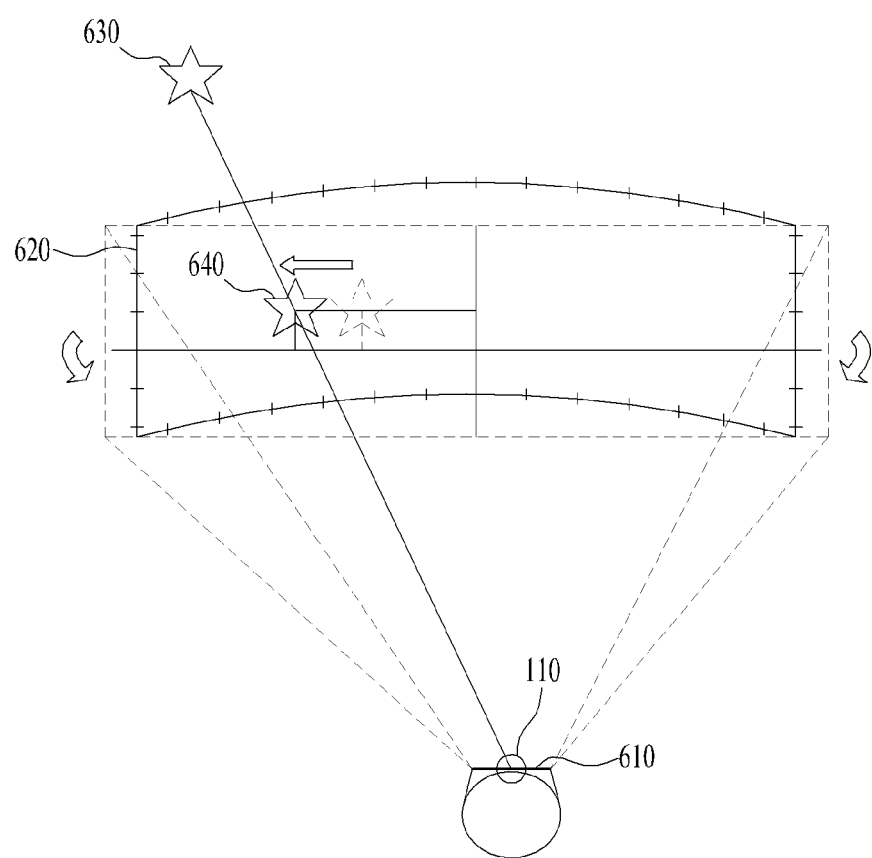

FIGS. 6A and 6B are views illustrating a display system 100 including an HMD device according to one embodiment of the present disclosure.

The display system 100 may be a device displaying visual information. At this time, the display system 100 may be configured with an HMD device 610 including a camera unit 110 and a bending sensor unit 130 and a display unit 620 including a transparent flexible display unit 120. More specifically, the display system 100 may be a system configured with the HMD device 610 and the display unit 620. Herein, the HMD device 610 may be a unit separated from the display unit 620. Herein, the HMD device 610 may be a wearable device which is wearable on the user.

According to one embodiment, the HMD device 610 may detect a real object 630 using the camera unit 110. In addition, the HMD device 610 may display an augmented reality object 640 corresponding to the real object 630 on the display unit 620. Herein, the HMD device 610 may include, for example, a communication unit (not shown). Herein, the communication unit may perform communication with the display unit 620 based on various protocols, thereby transmitting/receiving data. In addition, the communication unit may access a wired or wireless network to transmit/receive digital data such as content. According to one embodiment, the HMD device 610 may detect the real object 630. At this time, the HMD device 610 may set coordinates of the display unit 620. More specifically, the HMD device 610 may set coordinates along the vertical axis and horizontal axis with respect to the center of the display unit 620. In the case that the HMD device 610 detects the real object 630, the HMD device 100 may display the augmented reality object corresponding to the detected real object based on the coordinates of the display unit 620. At this time, the HMD device 100 may transfer the set coordinates to the display unit 620 through the communication unit. The display unit 620 may display the augmented reality object 640 corresponding to the real object 630 based on the received coordinates. In addition, the HMD device 100 may detect bending of the display unit 620 using the bending sensor unit 130. At this time, HMD device 100 may change the position to display the augmented reality object 640 corresponding to the real object 630, based on the angle of bending of the display unit 620. At this time, the HMD device 100 may determine the position to display the augmented reality object based on the coordinates of the display unit 620. The HMD device 100 may transfer set coordinates to the display unit 620 through the communication unit. The display unit 620 may the augmented reality object 640 corresponding to the real object 630 on the bent display unit 620, based on the received coordinates.

Figure 7A:
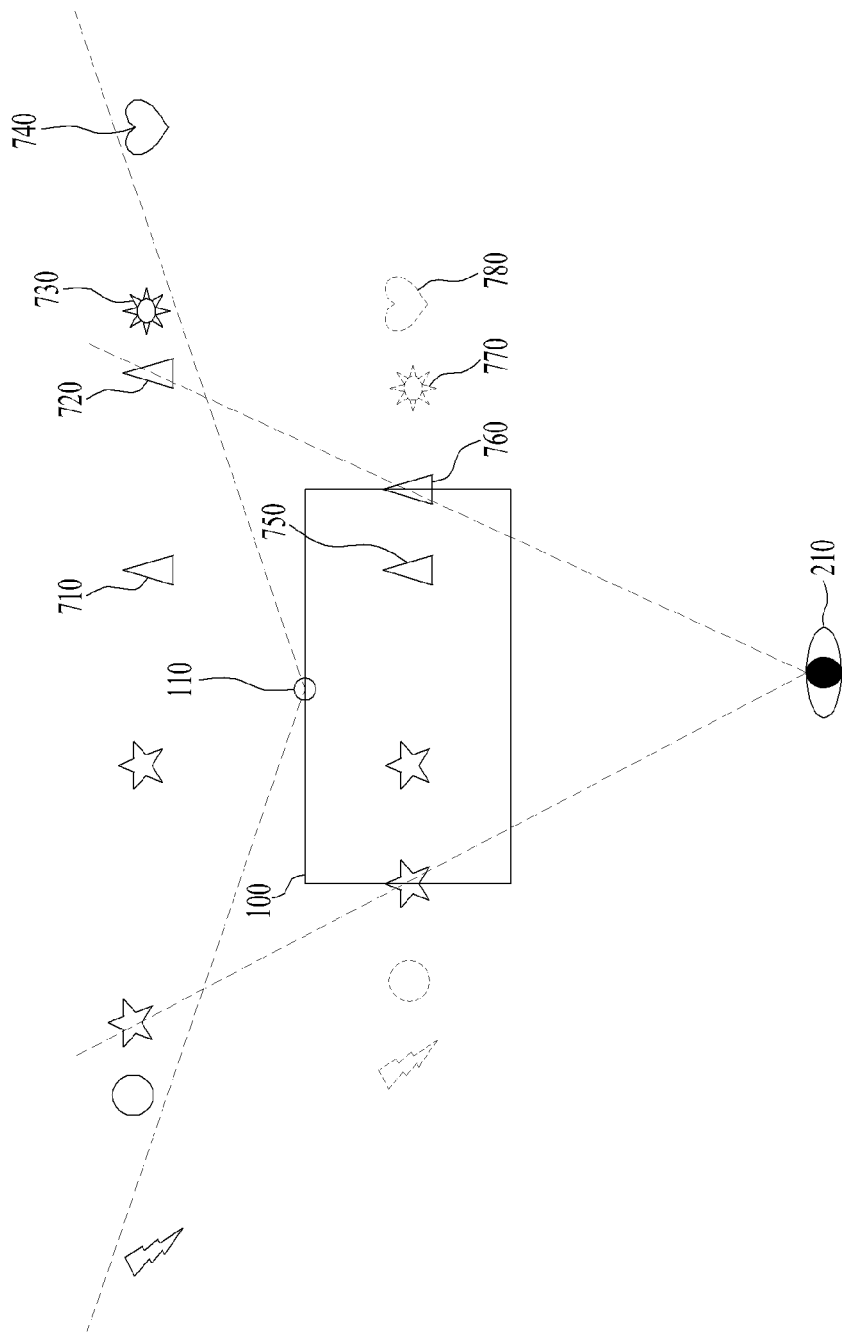

FIGS. 7A and 7B are views illustrating a method for the display system 100 to display an augmented reality object based on the viewing angle of the camera unit 110, according to one embodiment.

The display system 100 may detect a real object within the viewing angle of the camera unit 110. At this time, the viewing angle may be determined based on the center of the camera unit 110. In addition, the viewing angle may represent an angle of a region in which the camera unit 110 can detect a real object. The display system 100 may display an augmented reality object corresponding to the detected real object. At this time, the display system 100 may display the augmented reality object based on the point of intersection between the line of gaze of the user's eye 210 viewing a real object and the transparent flexible display unit 120. In the case that the point of intersection between the line of gaze of the user's eye 210 viewing a real object and the transparent flexible display unit 120 does not exist, the display system 100 cannot display the augmented reality object. That is, the display system 100 may only display an augmented reality object corresponding to a real object that the user's eye 210 can view through the transparent flexible display unit 120. The real object may be positioned within the viewing angle of the camera unit 110 and outside the angle of the user's field of view. Herein, the angle of the user's field of view may represent a region that the user can detect through the transparent flexible display unit 120.

At this time, in the case that the display system 100 detects bending of the transparent flexible display unit 120, the display system 100 may display a real object positioned within the viewing angle of the camera unit 110 and outside the angle of the user's field of view. More specifically, the angle of the user's field of view may increases when the transparent flexible display unit 120 is bent. That is, a region that the user can detect through the transparent flexible unit 120 is widened. In addition, the camera unit 110 may be positioned on a vertical axis arranged through the center of the transparent flexible display unit 120. In addition, the camera unit 110 may be positioned on a horizontal axis arranged through the center of the transparent flexible display unit 120. In the case that the camera unit 110 is positioned on the vertical axis of the transparent flexible display unit 120, the viewing angle of the camera unit 110 may remain constant when the transparent flexible display unit 120 is bent with respect to the vertical axis. In the case that the camera unit 110 is positioned on the horizontal axis of the transparent flexible display unit 120, the viewing angle of the camera unit 110 may remain constant when the transparent flexible display unit 120 is bent with respect the horizontal axis. In the case that bending of the transparent flexible display unit 120 is detected, a real object positioned outside the angle of the user's field of view may be positioned within the viewing angle of the camera unit 110 and the angle of the user's field of view. Accordingly, the display system 100 may display the augmented reality object corresponding to the real object.

In addition, in one embodiment, the angle of the user's field of view may increase when the angle of bending of the transparent flexible display unit 120 increase.

Referring to FIGS. 7A and 7B illustrating one embodiment, the display system may display a first augmented reality object 750 corresponding to a first real object 710 on the transparent flexible display unit 120. At this time, the first real object 710 may be positioned within the viewing angle of the camera unit 110 and the angle of the user's field of view. The display system may display a portion of the region of a second augmented reality object 760 corresponding to a second real object 720. For example, the second real object 720 may be positioned within the viewing angle of the camera unit 110 and at the boundary angle of the user's field of view. That is, the display system 100 may only display a second augmented reality object 760 corresponding to a portion of the second real object 720 within the angle of the user's field of view.

In addition, the display system 100 may detect a third real object 730. The third real object 730 may be positioned within the viewing angle of the camera unit 110 and outside the angle of the user's field of view. Accordingly, the display system 100 may detect the third real object 730, but may not display a third augmented reality object 770 corresponding to the third real object 730 on the transparent display unit 120.

In addition, the display system 100 may not detect a fourth real object 740. In addition, the display system 100 may not display a fourth augmented reality object 780 corresponding to the fourth real object 740. The fourth real object 740 may be positioned outside the viewing angle of the camera unit 110 and the angle of the user's field of view.

In the case that the display system 100 detects bending of the transparent flexible display unit 120, the display system 100 may display the third augmented reality object 770 corresponding to the third real object 730 on the transparent flexible display unit 120. More specifically, in the case that bending of the transparent flexible display unit 120 is detected, the angle of the user's field of view may increase. That is, the user may be allowed to detect a wider region through the transparent flexible display unit 120. Accordingly, in the case that the transparent flexible display unit 120 is bent, the third real object 730 may be positioned within the viewing angle of the camera unit 110 and the angle of the user's field of view. Thereby, the display system 100 may display the third augmented reality object 770 corresponding to the third real object 730 on the transparent flexible display unit 120.

FIG. 8 is a view illustrating a method for the display system 100 to display an augmented reality object based on the distance between a user's eye and the transparent flexible unit 120, according to one embodiment. The display system 100 may display an augmented reality object corresponding to a real object on the transparent flexible display unit 120. At this time, the display system 100 may detect a real object positioned within the viewing angle of the camera unit 110. The display system 100 may display an augmented reality object corresponding to the detected real object. In addition, the display system 100 may detect a real object positioned within the angle of the user's field of view real object. The display system 100 may display the augmented reality object corresponding to the detected real object. More specifically, the display system 100 may detect a real object positioned within the viewing angle of the camera unit 110 and within the angle of the user's field of view real object. The display system may display an augmented reality object corresponding to the detected real object.

At this time, in the case that the distance between the user's eye 210 and the transparent flexible display unit 120 is less than or equal to a threshold distance, the angle of the user's field of view may be greater than the viewing angle of the camera unit 110. More specifically, the user's eye 210 may be positioned behind the camera unit 110. Accordingly, in the case that the distance between the user's eye 210 and the transparent flexible display unit 120 is less than or equal to the threshold distance, the angle of the user's field of view may be greater than the viewing angle of the camera unit 110. Herein, the threshold distance may be a critical distance at which the angle of the user's field of view becomes greater than the viewing angle of the camera unit 110. In addition, the threshold distance may have a certain margin of error. In the case that the distance between the user's eye 210 and the transparent flexible display unit 120 exceeds the threshold distance, the angle of the user's field of view may be less than the viewing angle of the camera unit 110. In addition, the angle of the user's field of view may be determined based on the angle of bending of the transparent flexible display unit 120.

In the case that the angle of the user's field of view is greater than the viewing angle of the camera unit 110, the real object may be positioned outside the viewing angle of the camera unit 110 and within the angle of the user's field of view. In this case, the display system 100 cannot display an augmented reality object corresponding to the real object. More specifically, although the line of gaze of the user viewing the real object and the transparent flexible display unit 120 intersect, but the camera unit 110 cannot detect the real object. Accordingly, the display system 100 may not display the augmented reality object corresponding to the real object.

In addition, the display system 100 may display an indicator on the transparent flexible display unit 120 based on the viewing angle of the camera unit 110. Herein, the indicator may represent a region detectable by the viewing angle of the camera unit 110. Thereby, the user may set a region of a real object that the display system 100 can display. In addition, the display system 100 may display the indicator based on the distance between the user's eye 210 and the transparent flexible display unit 120. At this time, in the case that the distance between the user's eye 210 and the transparent flexible display unit 120, the display system 100 may display the indicator at a position closer to the edge of the transparent flexible display unit 120. In the case that the distance between the user's eye 210 and the transparent flexible display unit 120 decreases, the display system 100 may display the indicator at a position closer to the center point of the transparent flexible display unit 120. In addition, in the case that the distance between the user's eye 210 and the transparent flexible display unit 120 exceeds the threshold distance, the display system 100 may not display the indicator.

Referring to FIG. 8 illustrating one embodiment, the display system 100 may detect a first real object 810. The display system 100 may display a first augmented reality object 840 corresponding to the first real object 810 on the transparent flexible display unit 120. Herein, the first real object 810 may be positioned within the viewing angle of the camera unit 110 and within the angle of the user's field of view. The display system 100 may not display a second augmented reality object 850 corresponding to a second real object 820. At this time, the second real object 820 may be positioned outside the viewing angle of the camera unit 110 and within the angle of the user's field of view. Accordingly, although the line of gaze of the user's eye viewing the second real object 820 and the transparent flexible display unit 120 intersect, the display system 100 may not display the second augmented reality object 850 corresponding to the second real object. The display system 100 may not display a third augmented reality object 860 corresponding to a third real object 830. Herein, the third real object 830 may be positioned outside the viewing angle of the camera unit 110 and outside the angle of the user's field of view.

In addition, the display system 100 may display an indicator 870. At this time, the indicator 870 may be displayed based on the viewing angle of the camera unit 110. In addition, the indicator 870 may represent a region in which the display system 100 can display an augmented reality object. That is, the display system 100 may display the first augmented reality object 840 positioned within the indicator 870 on the transparent flexible display unit 120.

FIG. 9 is a view illustrating a method for controlling a display system according to one embodiment. The display system 100 may detect a first real object forming a first angle relative to the camera unit 110 (S910). At this time, as illustrated in FIG. 1, the camera unit 110 may detect the first angle about the center of the camera unit 110. Herein, the first angle may be a rightward, leftward, upward, or downward angle about the center of the camera unit 110. In addition, for example, the camera unit 110 may be positioned on a vertical axis passing through the center of the transparent flexible display unit 120. More specifically, the camera unit 110 may be positioned at the uppermost part of the vertical axis passing through the center point of the transparent flexible display unit 120. Thereby, the camera unit 110 may maintain a certain angle relative to the real object when the transparent flexible display unit 120 is bent.

In addition, the angle of the real object relative to the camera unit 110 may be determined further based on a line connecting the center of the transparent flexible unit 120 and the user's eye. More specifically, the camera unit 110 may detect the angle of the real object relative to the camera unit 110 based on the position information about the user's eyes and the transparent flexible display unit 120. For example, the camera unit 110 may include a sensor unit configured to detect real objects.

Next, the display system 100 may display a first augmented reality object corresponding to a first real object at a first position (S920). Herein, the first position may be determined based on a point at which the line of gaze of the user's eye 210 viewing the first real object and the transparent flexible display unit 120 intersect, as described above with reference to FIGS. 4A and 4C. The first position may be the point of intersection between the line of gaze of the user's eye 210 viewing the first real object and the transparent flexible display unit 120. For example, the first position may be the point of intersection between a line connecting the center of the user's left eye and right eye with the first real object and the transparent flexible display unit 120. In the case that the first augmented reality object is displayed in three dimension, the first position may be determined by the distance and angle of the first real object 410 relative to the user's left eye and the distance and angle of the first real object 410 relative to the user's right eye. That is, the first position may be changed and set by the display system 100, based on the user's eyes.

Next, the display system 100 may detect bending of the transparent flexible display unit 120 (S930). At this time, the bending sensor unit 130 may detect the angel at which the transparent flexible display unit 120 is bent, as illustrated in FIG. 1. In addition, the bending sensor unit 130 may detect the direction in which the transparent flexible display unit 120 is bent. Herein, the direction may be a direction in which bending occurs with respect to a vertical axis passing through the center of the transparent flexible display unit 120. In this case, the bending direction may be an inward direction directed toward the user. In addition, the bending direction may be an outward direction directed away from the user. The bending direction may be a direction in which bending occurs with respect to a horizontal axis passing through the center of the transparent flexible display unit 120. In this case, the bending direction may be an inward direction directed toward the user. In addition, the bending direction may be an outward direction directed away from the user.

As illustrated in FIGS. 5A and 5B, the angle of bending may vary with position within the transparent flexible display unit 120. For example, the angle of bending may be an average of angle of bendings at respective positions within the transparent flexible display unit 120. In addition, the angle of bending may be an angle of bending at a point within the transparent flexible display unit 120 where the augmented reality object is displayed. In addition, the angle of bending may increase when the transparent flexible display unit 120 is further bent. However, embodiments are not limited thereto.

Next, the display system 100 may display a first augmented reality object at a third position spaced a first distance apart from the first position (S940). Herein, the first position may be determined based on the point of intersection between the line of gaze of the user's eye 210 viewing the first real object 310 and the transparent flexible display unit 120, as illustrated in FIG. 3. In the case that the display system 100 detects bending of the transparent flexible display unit 120, the display system 100 may display the first augmented reality object 330 at the third position based on the angle of bending. At this time, the third position may be determined based on a point at which the line of gaze of the user's eye 210 viewing the first real object 310 and the bent transparent flexible display unit 120 intersect. In addition, the third position may be spaced a first distance apart from the first position. For example, the third position may be spaced the first distance apart from the first position toward the center of the transparent flexible display unit 120. In addition, the third position may be spaced the first distance apart from the first position toward the opposite side of the center point of the transparent flexible display unit 120.

As illustrated in FIGS. 4A to 4C, the first distance may be a distance from the center point of the transparent flexible display unit 120 to a position shifted to the inside or the outside. More specifically, the inside may be a position shifted closer to the center of the transparent flexible display unit 120. The outside may be a position shifted closer to the edge of the transparent flexible unit 120 toward the opposite side of the center of the transparent flexible display unit 120. That is, the display system 100 may determine that the center of the transparent flexible unit 120 is the innermost position.

Next, the display system 100 may detect change in the first angle (S950). At this time, in the case that the display system 100 may detect increase of the first angle, the display system 100 may increase the first distance (S960). On the other hand, in the case the display system 100 detects decrease of the first angle, the display system 100 may reduce the first distance (S970). In the case that the first angle increases, the first position may be shifted away from the center point of the transparent flexible display unit 120, as illustrated in FIG. 3. The display system 100 may detect bending of the transparent flexible display unit 120. In the case that the display system 100 detects bending of the transparent flexible display unit 120, the display system 100 may display the first augmented reality object 330 at the third position based on the angle of bending. At this time, the third position may be determined based on a point at which the line of gaze of the user's eye 210 viewing the first real object 310 and the bent transparent flexible display unit 120 intersect. In addition, the third position may be spaced the first distance apart from the first position. For example, the third position may be spaced the first distance apart from the first position toward the center of the transparent flexible display unit 120. In addition, the third position may be spaced the first distance apart from the first position toward the opposite side of the center point of the transparent flexible display unit 120. That is, in the case that the first angle increases, the first distance increase More specifically, the angle of bending of the transparent flexible display unit 120 may increase as the position is shifted farther away from the center point of the transparent flexible display unit 120. In addition, the difference in position of the augmented reality object may increase as the angle of bending of the transparent flexible display unit 120 increases. Accordingly, in the case that the first angle increases, the first distance may increase. That is, when the angle of the real object relative to the user's eye 210 increases, the display system 100 may increase the difference in position of the augmented reality object.

FIG. 10 is a view illustrating a method for controlling a display system according to one embodiment. The display system 100 may detect a first real object forming a first angle relative to the camera unit 110. In addition, the display system 100 may detect a second real object forming a second angle relative to the camera unit 110 (S1010). At this time, the camera unit 110 may detect the first angle and second angle based on the center point of the camera unit 110, as illustrated FIG. 1. At this time, the first angle and second angle may be rightward, leftward, upward, or downward angles about the center of the camera unit 110. In addition, for example, the camera unit 110 may be positioned on a vertical axis passing through the center of the transparent flexible display unit 120. More specifically, the camera unit 110 may be positioned at the uppermost part of the vertical axis passing through the center point of the transparent flexible display unit 120.

Thereby, the camera unit 110 may maintain a certain angle relative to the real object when the transparent flexible display unit 120 is bent.

Next, the display system 100 may display a first augmented reality object corresponding to the first real object at a first position. In addition, the display system 100 may display a second augmented reality object corresponding to the second real object at a second position (S1020). Herein, the first position may be determined based on the point of intersection between the line of gaze of the user's eye 210 viewing the first real object and the transparent flexible display unit 120, as illustrated in FIGS. 4A and 4B. The second position may be determined based on the point of intersection between the line of gaze of the user's eye 210 viewing the second real object and the transparent flexible display unit 120. The first position may be the point of intersection between the line of gaze of the user's eye 210 viewing first real object and the transparent flexible display unit 120. For example, the first position may be the point of intersection between a line connecting the center of the user's left eye and right eye with the first real object 410 and the transparent flexible display unit 120. In the case that the first augmented reality object is displayed in three dimension, the first position may be determined by the distance and angle of the first real object 410 relative to the user's left eye and the distance and angle of the first real object 410 relative to the user's right eye. That is, the first position may set by the display system 100, based on the user's eyes. In addition, the second position may be the point of intersection between the line of gaze of the user's eye 210 viewing the second real object and the transparent flexible display unit 120.

Next, the display system 100 may detect bending of the transparent flexible display unit (S1030). Herein, the angle of bending may vary with position within the transparent flexible display unit 120, as illustrated in FIGS. 5A and 5B. For example, the angle of bending may be an average of angle of bendings at respective positions within the transparent flexible display unit 120. In addition, the angle of bending may be an angle of bending at a point within the transparent flexible display unit 120 where the augmented reality object is displayed. In addition, the angle of bending may increase when degree of bending of the transparent flexible display unit 120 increase. However, embodiments are not limited thereto.

Next, the display system 100 may display a first augmented reality object at a third position spaced a first distance apart from the first position. In addition, the display system 100 may display a second augmented reality object at a fourth position spaced a second distance apart from the second position (S1040). At this time, in the case that the display system 100 detects bending of the transparent flexible display unit 120, the display system 100 may display the first augmented reality object 330 at the third position based on the angle of bending, as illustrated in FIG. 3. Herein, the third position may be determined based on the point of intersection between the line of gaze of the user's eye 210 viewing the first real object 310 and the bent transparent flexible display unit 120. In addition, the fourth position may be determined based on the point of intersection between the line of gaze of the user's eye 210 viewing the second real object 320 and the bent transparent flexible display unit 120.

The third position may be a position spaced the first distance apart from the first position. For example, the third position may be spaced the first distance apart from the first position toward the center of the transparent flexible display unit 120. In addition, the third position may be spaced a first distance apart from the first position toward the opposite side of the center point of the transparent flexible display unit 120.

At this time, the fourth position may be spaced a second distance apart from the second position. For example, the fourth position may be spaced the second distance apart from the second position toward the center of the transparent flexible display unit 120. In addition, the fourth position may be spaced the second distance apart from the second position toward the opposite side of the center of the transparent flexible display unit 120.

In addition, as illustrated in FIGS. 4A to 4C, the first distance and second distance may be positions shifted to the inside or the outside with respect to the center of the transparent flexible display unit 120. More specifically, the inside may be a position shifted closer to the center point of the transparent flexible display unit 120. In addition, The outside may be a position shifted closer to the edge of the transparent flexible unit 120 toward the opposite side of the center of the transparent flexible display unit 120. That is, the display system 100 may determine that the center of the transparent flexible unit 120 is the innermost position.

Next, the display system 100 may compare the first angle with the second angle (S1050). At this time, in the case that the first angle is greater than the second angle, the display system 100 may set the first distance to be greater than the second distance (S1060). On the other hand, in the case that the first angle is less than the second angle, the display system 100 may set the first distance to be less than the second distance (S1070). At this time, in the case that the first angle is greater than the second angle, the first distance may be greater than the second distance, as illustrated in FIG. 3. More specifically, the first position may be positioned farther from the center point of the transparent flexible display unit 120 than the second position. At this time, the angle of bending of the transparent flexible display unit 120 may increase as the position is shifted away from the center point of the transparent flexible display unit 120. In addition, the difference in position of the augmented reality object may increase as the angle of bending of the transparent flexible display unit 120 increases. Accordingly, in the case that the first angle is greater than the second angle, the first distance may be greater than the second distance. That is, the display system may increase the difference in position of the augmented reality object as the angle of the real object relative to the user's eye 210 increases. In the case that the first angle is less than the second angle, the first distance may be less than the second distance. More specifically, the angle of bending of the transparent flexible display unit 120 may increase as the position is shifted away from the center of the transparent flexible display unit 120. In addition, the difference in position of the augmented reality object may increase as the angle of bending of the transparent flexible display unit 120 increases. Accordingly, in the case that the first angle is greater than the second angle, the first distance may be greater than the second distance. That is, the display system may increase the difference in position of the augmented reality object when the angle of the real object relative to the user's eye 210 increases.

Although descriptions have been given for the respective drawings for ease of illustration, embodiments in the drawings may also be merged into a new embodiment. The scope of the present disclosure covers designing a recording medium readable by a computer having a program recorded to execute the previous embodiments as desired by those skilled in the art.

The display system 100 and a control method for the same according to the present disclosure are not limited to the above embodiments. Parts or all of the above embodiments can be selectively combined to make various variations.

Meanwhile, the display system 100 and a control method for the same in the present disclosure may be implemented in a recording medium as a code readable by a processor provided to a network device. The recording medium readable by the processor includes all kinds of recording devices to store data readable by the processor. Examples of the recording medium readable by the processor include ROMs, RAMs, magnetic tapes, floppy disks, and optical data storage devices. Examples also include implementation in the form of carrier wave such as transmission over the Internet. In addition, the recording medium readable by the processor may be distributed to a computer system connected over a network, and thus codes readable by the processor may be stored and executed in a distributed system.

As is apparent from the above description, the present invention has effects as follows.

According to the present disclosure, a display system may detect a real object and display an augmented reality object on a transparent flexible display unit based on the angle of the detected real object relative to the camera unit.

According to the present disclosure, in the case that the display system detects bending of the transparent flexible display unit, the display system may control the position to display an augmented reality object on the transparent flexible display unit based on the angle of bending.

According to the present disclosure, the display system may detect the distance between the user's eye and the transparent flexible display unit and control the position to display an augmented reality object based on the detected distance.

According to the present disclosure, the display system may display an indicator indicating the limit of a region to display an augmented reality object based on the viewing angle of the camera unit.

According to the present disclosure, a display system configured with a head mounted display (HMD) device and a display unit are provided.

It will be apparent to those skilled in the art that various modifications and variations can be made in the present disclosure without departing from the spirit or scope of the present disclosure. Thus, the present invention is intended to cover the modifications and variations of this disclosure provided they come within the scope of the appended claims and their equivalents. The variations should not be separately understood from the spirit or prospect of the present disclosure.

In this specification, both a product invention and a method invention have been described. The descriptions thereof may be supplementarily applicable, when necessary.

What is claimed is:

1. A display system comprising:
    a camera unit configured to detect a real object positioned within a viewing angle;
    a transparent flexible display unit configured to display an augmented reality object based on the real object;
    a bending sensor unit configured to detect bending of the transparent flexible display unit;
    a processor configured to control the camera unit, the transparent flexible display unit and the bending sensor unit,
    wherein the processor is further configured to:
    display a first augmented reality object corresponding to a first real object forming a first angle relative to the camera unit at a first position on the transparent flexible display unit, and
    display a second augmented reality object corresponding to a second real object forming a second angle relative to the camera unit at a second position on the transparent flexible display unit,
    wherein, if the bending of the transparent flexible display unit is detected, display the first augmented reality object at a third position spaced a first distance apart from the first position, and display the second augmented reality object at a fourth position spaced a second distance apart from the second position,
    wherein, when the first angle is greater than the second angle, the first distance is set to be greater than the second distance.

2. The display system according to claim 1, wherein:
    the first position is determined based on a point of intersection between a line of gaze of a user viewing the first real object and the transparent flexible display unit; and
    the second position is determined based on a point of intersection between a line of gaze of the user viewing the second real object and the transparent flexible display unit.

3. The display system according to claim 2, wherein the processor is further configured to:
    when the point of intersection between the line of gaze of the user viewing the first real object and the transparent flexible display unit does not exist, not display the first augmented reality object corresponding to the first real object.

4. The display system according to claim 3, wherein the processor is further configured to:
    if the bending of the transparent flexible display unit is detected, display the first augmented reality object corresponding to the first real object at the point of intersection when the point of intersection between the line of gaze of the user viewing the first real object and the transparent flexible display unit exists.

5. The display system according to claim 1, wherein the processor is further configured to determine the third position and the fourth position based on an angle of the bending of the transparent flexible display unit.

6. The display system according to claim 5, wherein:
    the third position is determined based on a point of intersection between a line of gaze of a user viewing the first real object and the bent transparent flexible display unit; and
    the fourth position is determined based on a point of intersection between a line of gaze of the user viewing the second real object and the bent transparent flexible display unit.

7. The display system according to claim 5, wherein the processor is further configured to:
    when the angle of the bending of the transparent flexible display unit increases, increase the first distance and the second distance based on the angle of the bending.

8. The display system according to claim 1, further comprising a sensor unit configured to detect an angle of the real object relative to the camera unit,
    wherein the camera unit is positioned on a vertical axis passing through a center point of the transparent flexible display unit,
    wherein the first angle and the second angle are determined based on the center point of the camera unit.

9. The display system according to claim 8, wherein the first angle and the second angle are determined further based on a line connecting the center point of the transparent flexible display unit with the line of gaze of the user.

10. The display system according to claim 8, wherein the sensor unit further detects a distance and angle of the transparent flexible display unit relative to a user's eyes,
    wherein the processor is further configured to determine the third position and the fourth position based on at least one of the distance and the angle of the transparent flexible display unit relative to the user's eyes.

11. The display system according to claim 10, wherein:
the third position is located outside the first position when the distance of the transparent flexible display unit relative to the user's eyes is greater than or equal to a threshold distance; and
the third position is located at inside the first position when the distance of the transparent flexible display unit relative to the user's eyes is less than the threshold distance,
wherein the threshold distance is determined based on the first angle.

12. The display system according to claim 11, wherein the processor is further configured to determine the inside position and the outside position based on the center point of the transparent flexible display unit,
wherein the inside position is a position shifted closer to the center point of the transparent flexible display unit, and the outside position is a position shifted closer to an edge of the transparent flexible display unit.

13. The display system according to claim 1, wherein:
the first angle is further determined based on a center point between the user's left eye and right eye and a position of the first real object; and
the second angle is further determined based on center point between the user's left eye and right eye and a position of the second real object.

14. The display system according to claim 13, wherein the processor is further configured to:
when the first augmented reality object is a three-dimensional object, determine the first position and the third position based on a distance and angle of the first real object relative to the user's left eye and a distance and angle of the first real object relative to the user's right eye.

15. The display system according to claim 1, wherein, when a distance between a user's eyes and the transparent flexible display unit is within a threshold distance, the angle of the user's field of view is greater than the viewing angle,
wherein the processor is further configured to:
when the first real object is positioned outside of the viewing angle and within the angle of the user's field of view, not display the first augmented reality object corresponding to the first real object.

16. The display system according to claim 15, wherein the processor is further configured to:
display an indicator on the transparent flexible display unit based on the viewing angle,
wherein the indicator indicates a limit of a region for display of the augmented reality object on the transparent flexible display unit.

17. The display system according to claim 16, wherein the indicator is displayed based on an angle of bending of the transparent flexible display unit.

18. The display system according to claim 1,
comprising a head mounted display (HMD), wherein, the HMD includes the camera unit and the bending sensor unit; and
comprising a display unit, wherein, the display unit includes the transparent flexible display unit.

19. The display system according to claim 18, wherein:
the first angle is an angle formed relative to the camera unit of the HMD by the first real object; and
the second angle is an angle formed relative to the camera unit of the HMD by the second real object.

20. A control method for a display system comprising:
detecting a real object,
wherein the detecting the real object comprises: detecting a first real object forming a first angle relative to a user's eyes and detecting a second real object forming a second angle relative to the user's eyes,
displaying an augmented reality object corresponding to the real object on a transparent flexible display unit,
wherein the displaying the augmented reality object corresponding to the real object on a transparent flexible display unit comprises: displaying a first augmented reality object corresponding to the first real object at a first position on the transparent flexible display unit, and displaying a second augmented reality object corresponding to the second real object at a second position on the transparent flexible display unit;
detecting bending of the transparent flexible display unit; and
displaying the augmented reality object on the bent transparent flexible display unit,
wherein the displaying of the augmented reality object comprises: displaying the first augmented reality object at a third position spaced a first distance apart from the first position based on the bending and displaying the second augmented reality object at a fourth position spaced a second distance apart from the second position based on the bending,
wherein, when the first angle is greater than the second angle, the first distance is set to be greater than the second distance.

* * * * *